United States Patent
Sakuta et al.

(10) Patent No.: US 6,905,993 B2
(45) Date of Patent: Jun. 14, 2005

(54) ZIRCONIA BASED SINTERED BODY EXCELLENT IN DURABILITY AND WEAR RESISTANT PARTS USING THE SAME

(75) Inventors: Miyuki Sakuta, Sakai (JP); Hiroshi Onishi, Sakai (JP); Toshio Kawanami, Sakai (JP)

(73) Assignee: Nikkato Corporation, Osaka (JP)

( * ) Notice: Subject to any disclaimer, the term of this patent is extended or adjusted under 35 U.S.C. 154(b) by 0 days.

(21) Appl. No.: 10/469,605
(22) PCT Filed: Aug. 2, 2002
(86) PCT No.: PCT/JP02/07921
§ 371 (c)(1), (2), (4) Date: Sep. 2, 2003
(87) PCT Pub. No.: WO03/033433
PCT Pub. Date: Apr. 24, 2003

(65) Prior Publication Data
US 2004/0162214 A1 Aug. 19, 2004

(30) Foreign Application Priority Data
Oct. 18, 2001 (JP) ......................................... 2001-321187
Apr. 16, 2002 (JP) ......................................... 2002-113975

(51) Int. Cl.[7] ............................................. C04B 35/486
(52) U.S. Cl. ........................ 501/105; 501/152; 501/153; 501/154
(58) Field of Search .................. 501/103, 105, 501/152, 153, 154

(56) References Cited

U.S. PATENT DOCUMENTS 5,656,564 A * 8/1997 Nakayama et al. ......... 501/103
5,955,392 A * 9/1999 Takeuchi et al. ............ 501/103
6,358,874 B1 * 3/2002 Kobayashi et al. .......... 501/105

FOREIGN PATENT DOCUMENTS

| JP | 06072767 A | * | 3/1994 | ............ C04B/35/48 |
| JP | 2001316178 A | * | 11/2001 | ............ C04B/35/48 |
| JP | 2002154873 A | * | 5/2002 | ............ C04B/35/48 |

* cited by examiner

Primary Examiner—David Sample
(74) Attorney, Agent, or Firm—Oliff & Berridge, PLC

(57) ABSTRACT

The present invention relates to a zirconia based sintered body excellent in durability, characterized in that in $Y_2O_3$-toughened zirconia based sintered body, (a) $ZrO_2$ contained therein is mainly composed of tetragonal $ZrO_2$, and the sintered body contains $Y_2O_3$ as a secondary component and further $SiO_2$ and $Al_2O_3$ as a third component;

(b) the sintered body has a molar ratio of $Y_2O_3/ZrO_2$ in the range of 1.5/98.5 to 4/96;

(c) the sintered body has a $SiO_2$ content of 0.05 to 2.5 wt %;

(d) the sintered body has a $Al_2O_3$ content of 0.05 to 3.0 wt %;

(e) the sintered body has an average crystal grain diameter of 0.7 μm or less;

(f) $SiO_2$ (wt %)×average crystal grain diameter (μm) takes a value ranging from 0.03 to 0.5;

(g) the sintered body contains at least one oxide of $Na_2O$, $K_2O$, CaO and $Fe_2O_3$ as an impurity and a weight ratio of $SiO_2$/(total amount of the impurity) is 5 or more; and (h) the sintered body has a bulk density of 5.70 g/cm³ or more; and a part using the sintered body that requires high strength and wear resistance.

13 Claims, No Drawings

ZIRCONIA BASED SINTERED BODY EXCELLENT IN DURABILITY AND WEAR RESISTANT PARTS USING THE SAME

TECHNICAL FIELD

The present invention relates to a zirconia based sintered body excellent in durability and a field in which the zirconia based sintered body is used, for example mill parts, industrial wear resistant structural materials, or wear resistant machine elements, particularly bearings, and further parts for components of electronic and communication equipments, such as connectors for optical fibers and the like.

BACKGROUND ART

In recent years, the production of advanced materials, such as electronic materials requires particle size reduction and high purification, and mills used therefor is mainly agitator mill in which grinding and dispersion media are stirred at a high speed compared with prior ball mills and which have a high grinding and dispersing efficiency. Such mills use ceramics that are excellent in impact properties and wear resistance as a material for mills as the material is under considerably high load. In particular, $Y_2O_3$-toughened zirconia (Y-TZP) composed of tetragonal zirconia is used as materials for mill parts.

In the agitator mill, it is unavoidable to result in a rise in temperature in the mill in operation. Thus, materials for mill are under considerably high load as they are exposed to high temperature and a corrosive component such as water, and further stirred with grinding and dispersion media. Therefore, it becomes important that the materials have stable durability for a long period in mechanical properties such as strength and wear resistance.

On the other hand, as ceramics have excellent wear and corrosion resistance and are lightweight, compared with metal, they have become so as to be used as material for machine elements with wear resistance, in particular bearing balls (rolling elements) in bearings in place of the prior metals. The bearings in which bearing balls made of ceramics are used provide stable rotation compared with ones made of metals when the rotation rate of a hard disk is increased in order to improve recording density. Therefore, such bearings have become so as to be used in spindle motors for driving hard disks in recent years. For example, bearing balls made of silicon nitride are used in order to accelerate the rate of spindle motors and improve lubricant life under high temperatures.

However, as spindle motors are used in a state where preload is applied to ball bearings in order to attain high rotational precision and linear expansion coefficient of silicon nitride is lower than that of ball bearing steel used in ball bearings, the bearing balls made of silicon nitride have problems that the preload therein varies largely depending on a rise in temperature, and therefore the bearing balls can not provide high rotational precision and are liable to lead to errors in reading and writing.

Japanese Patent Laid-open No. 2000-74069 discloses that bearing balls made of zirconia having a linear expansion coefficient close to that of ball bearing steel can reduce changes in preload due to temperature variations and thus improve rotational precision at a high rotational rate. However, the publication merely specifies the linear expansion coefficient of the bearing balls made of zirconia, and does not specify mechanical properties and the like as a sintered body for forming excellent bearing balls at all.

In addition, it has been pointed out that zirconia based sintered bodies give rise to deterioration as mentioned below and the sintered bodies have problems that they are not fully suited for bearings that are required to be used stably under several environments for a long term.

Further, also in the field of electronic and communication equipments, zirconia ferrules used as connectors for optical fibers are required to have 100% of reliability in durability so as not to give rise to change in shape due to transformation even when they are used at a temperature of 50° C. or more for a long time.

Although $Y_2O_3$-toughened zirconia (Y-TZP) that is a zirconia based sintered body has excellent mechanical properties, it is known that Y-TZP gives rise to transformation from tetragonal zirconia to monoclinic zirconia at a specific temperature range from 200 to 300° C. and causes thermal degradation leading to a lowering of strength. Japanese Patent Publication No. Sho 61-21184 proposes many countermeasures therefor. But it has recently become clear that the above-mentioned zirconia sintered bodies are lowered in mechanical properties such as strength or wear resistance, or cause small changes in dimension when they are exposed to a high temperature of 60 to 150° C. at which the zirconia is used, or an aqueous medium or a high humidity atmosphere at the high temperature under particularly high load conditions for a long time. And, it has become clear that the countermeasures against thermal degradation at 200 to 300° C. can not resolve the above-mentioned problems.

A zirconia sintered body is improved in durability such as wear resistance under load at a relatively low temperature of about 20° C. as the crystal structure thereof becomes fine but lowered in resistance to corrosive component such as water. In addition, the prior zirconia sintered bodies are lowered in mechanical properties such as wear resistance under load at a high temperature of about 60 to 150° C. in a dry or a high humidity atmosphere or an aqueous medium. Thus, for example, the prior zirconia sintered bodies do not satisfy requirements as materials for bearings that are rotated at a high rate under load and cause a rise in temperature, and therefore are required to be further improved.

Japanese Patent Laid-open No. 2000-302548 proposes a method of producing a zirconia sintered body excellent in thermal stability by limiting the crystal grain diameter to a specific range and incorporating a third component including $Al_2O_3$, $SiO_2$ and $TiO_2$.

However, even when the third component including $Al_2O_3$, $SiO_2$ and $TiO_2$ is incorporated, glass phases are formed in the zirconia sintered body due to impurities such as an alkali metal or an alkaline earth metal present therein and the glass phases may lead to a lowering in durability. Thus, the zirconia based sintered bodies can not be fully improved only by adding the third component mentioned above. In addition, the method disclosed in the Patent publication can prevent thermal degradation of zirconia based sintered bodies in a case where it is exposed to a warm water or a high humidity atmosphere near 200° C., but has not attained a perfect prevention of lowering in durability in a case where the product is particularly under load at a practical temperature range of about 60 to 150° C.

In addition, the crystal grain boundary of the zirconia sintered body becomes weak when it is exposed to load under a condition without humidity or steam at a temperature of about 60 to 150° C. As a result of it, the product has also a problem to cause a rapid wear due to loss of crystal grains.

Consequently, it has been required to provide materials that have excellent and thermal stability, corrosion resistance, mechanical properties and durability at an elevated temperature of about 60 to 150° C. in a dry or a high humidity atmosphere, or in an aqueous medium over a long period and that have excellent strength and wear resistance regardless of whether a high humidity atmosphere is present or not.

An object of the present invention is to provide a zirconia based sintered body exhibiting excellent thermal stability and corrosion resistance, having stable and excellent mechanical properties for a long time, in particular wear resistance and being excellent in durability, even in a case where it is applied to particularly a load, for example where it is exposed to a dry or a high humidity atmosphere, or in an aqueous medium at an elevated temperature of about 60 to 150° C.

Another object of the present invention is to provide parts that require strength and wear resistance, using the above-mentioned zirconia based sintered bodies, and the parts include for example mill parts for grinding or dispersing apparatuses, wear resistant machine elements, in particular bearings or the like.

Disclosure of Invention

The present inventors have eagerly studied taking the above-mentioned present status into account, and consequently found that lowering of mechanical properties such as strength or wear resistance of zirconia based sintered bodies at an elevated temperature of about 60 to 150° C. in a dry or a high humidity atmosphere, or in an aqueous medium is different from changes in thermal stability at a temperature of 200 to 300° C. in their causes.

That is, thermal degradation at a temperature of 200 to 300° C. results from a transformation from metastable tetragonal zirconia to stable monoclinic zirconia, and it is known that the thermal degradation can be inhibited by incorporating an increased amount of stabilizer, such as $Y_2O_3$ or $CeO_2$.

On the other hand, it is assumed that lowering of strength and mechanical properties on exposure to a dry or a high humidity atmosphere, or an aqueous medium at an elevated temperature of about 60 to 150° C. results from that glass phases unhomogeneously present at the grain boundary or the grain boundary face, or amorphous phases $Y_2O_3$ and the like segregated at the grain boundary undergo stress corrosion. In the interim, $SiO_2$ is segregated near $ZrO_2$ crystal grain boundary and exerts an effect inhibiting thermal degradation, but it becomes clear that if impurities such as an alkali metal or an alkaline earth metal are present together, glassy phases are formed at $ZrO_2$ crystal grain boundary and thereby resistance against stress corrosion is lowered. From this fact, the present inventors found that it is important to control not only an amount of $SiO_2$ to be added but also an amount of impurities such as an alkali metal or an alkaline earth metal based on that of $SiO_2$ in order to improve physical properties of zirconia sintered bodies.

In addition, the present inventors found also that in order to impart excellent durability to a zirconia sintered body, it is important for $SiO_2$ at $ZrO_2$ crystal grain boundary to be segregated homogeneously in a suitable amount, and it is also important to control an amount of $SiO_2$ to be added depending on its crystal grain size as grain boundary surface areas are different each other depending on the crystal grain size.

The present inventors found that can be obtained zirconia based sintered bodies inhibiting grain boundary corrosion at an elevated temperature of about 60 to 150° C. in a dry or a high humidity atmosphere, or in an aqueous medium, and excellent in durability such as wear resistance even under load, by controlling a molar ratio of $Y_2O_3/ZrO_2$, an amount of a third component including $Al_2O_3$ and $SiO_2$, crystal grain diameter, bulk density, and a relation between the amount of $SiO_2$ and average crystal grain diameter, and a relation between the amount of $SiO_2$ and the amount of impurities, for example alkali metals or alkaline earth metals such as $Na_2O$, $K_2O$ or $CaO$, or $Fe_2O_3$ or $TiO_2$, etc., in a specific range, and the present inventors completed the present invention.

That is, a first aspect of the present invention relates to a zirconia based sintered body excellent in durability, characterized in that in $Y_2O_3$-toughened zirconia based sintered body, (a) $ZrO_2$ contained therein is mainly composed of tetragonal $ZrO_2$, and the sintered body contains $Y_2O_3$ as a secondary component and further $SiO_2$ and $Al_2O_3$ as a third component;

(b) the sintered body has a molar ratio of $Y_2O_3/ZrO_2$ in the range of 1.5/98.5 to 4/96;

(c) the sintered body has a $SiO_2$ content of 0.05 to 2.5 wt %;

(d) the sintered body has a $Al_2O_3$ content of 0.05 to 3.0 wt %;

(e) the sintered body has an average crystal grain diameter of 0.7 µm or less;

(f) $SiO_2$ (wt %)×average crystal grain diameter (µm) takes a value ranging from 0.03 to 0.5;

(g) the sintered body contains at least one oxide of $Na_2O$, $K_2O$, $CaO$ and $Fe_2O_3$ as an impurity and a weight ratio of $SiO_2$/(total amount of the impurity) is 5 or more; and (h) the sintered body has a bulk density of 5.70 g/cm$^3$ or more.

A second aspect of the present invention relates to the zirconia based sintered body, wherein further contains $TiO_2$ as an impurity and the content of $TiO_2$ is 0.3 wt % or less.

A third aspect of the present invention relates to a parts that requires high strength and wear resistance, characterized in that a working face part or whole of the parts is made of the zirconia based sintered body of the first or second aspect of the present invention.

In the interim, in the present specification and claims, a zirconia based sintered body "excellent in durability" means that the sintered body shows little thermal degradation, or little lowering in strength or change in dimension due to transformation, even when it is exposed to a dry or a high humidity atmosphere, or an aqueous medium at an elevated temperature of about 60 to 150° C. for a long time, and that the sintered body shows little thermal degradation due to transformation from tetragonal zirconia to monoclinic zirconia.

In addition, "a parts that requires high strength and wear resistance" includes parts that are exposed to a high temperature in a state where load is applied on the working face part or whole of the parts, for example mill parts for grinding or dispersing apparatuses, wear resistant machine elements, in particular bearings or element components thereof, or the like.

Further, "mill parts for grinding or dispersing apparatuses" are a general term meaning parts in equipments, jigs or mechanical apparatuses for grinding, dispersing or pulverizing a solid under dry or wet condition, in which the parts contacts the solid, and include grinding and dispersion media. The "grinding or dispersing apparatuses" include concretely grinding and dispersing apparatuses, mixers, granulators, particle size selectors, agitators, dryers, transporting apparatuses and the like.

In addition, bearings include several shaped ones, such as rolling bearings, journal bearings and the like to which the present invention is not limited. The "element parts thereof" include rolling elements used in bearings, and holding parts therefor, or the like.

The followings will explain each requisite that zirconia based sintered bodies excellent in durability of the present invention should fulfil.

(a) As to that the Sintered Bodies are $Y_2O_3$-Toughened Zirconia Based Sintered Bodies Mainly Composed of Tetragonal $ZrO_2$ Crystal Phase If monoclinic zirconia is contained in zirconia based sintered bodies, fine cracks occur near the periphery of the crystal. When the sintered body is under any stress, microfracture occurs from the fine cracks and thereby leading to a lowering in resistance against wear, impact, crush or the like. Therefore, the sintered bodies are not preferable as they lead to a reduction of life in mill parts for grinding or dispersing apparatuses, or rolling bearings that are made of the sintered bodies. In addition, the sintered bodies are not preferable as durability is lowered when they are under load in a dry or a high humidity atmosphere, or in an aqueous medium, at an elevated temperature of about 60 to 150° C.

On the other hand, if cubic zirconia is contained in sintered bodies, crystal grain diameter becomes large. Thus, the sintered bodies are not preferable as durability is lowered by not only causing a lowering in mechanical properties but also inducing easily a segregation of $Y_2O_3$ near crystal grain boundary.

In the interim, in the present invention, the presence or absence and the content of monoclinic zirconia (M) as zirconia crystal phase, and the contents of tetragonal zirconia (T) and cubic zirconia (C) are determined by X-ray diffraction according to the following process. That is, the surface of a sintered body and an article manufactured from the sintered body is transformed from tetragonal zirconia to monoclinic zirconia due to stress-induced phase transformation, and the real crystal phase thereof can not be identified. Thus, the surface is polished until it becomes a mirror surface, and measured by X-ray diffraction in a range of diffraction angle of 27 to 34 degrees. Thereafter, the presence or absence and the content of monoclinic zirconia are determined and calculated from the following equation:

Content of monoclinic zirconia $(M)$(vol %)=[$I_M(111)$+$I_M(11\bar{1})$]/[$I_M(111)$+$I_M(11\bar{1})$+$I_{T+C}(111)$]×100 wherein $I_M(111)$ is peak height of diffraction peak (111) of monoclinic zirconia, $I_M(11\bar{1})$ is peak height of diffraction peak ($11\bar{1}$) of monoclinic zirconia, and $I_{T+C}(111)$ is peak height of a diffraction peak of tetragonal and cubic zirconia.

In addition, the contents of tetragonal zirconia and cubic zirconia are measured by X-ray diffraction in a range of diffraction angle of 70 to 77 degrees, and calculated from the following equation similarly to the process by which the presence or absence of monoclinic zirconia is confirmed:

Content of cubic zirconia $(C)$(vol %)=[$I_{T+C}(111)$/[$I_M(111)$+$I_M(11\bar{1})$+$I_{T+C}(111)$]]×[$I_C(400)$/[$I_C(400)$+$I_T(400)$+$I_T(004)$]]×100

Content of tetragonal zirconia $(T)$(vol %)=100−M−C wherein $I_M(111)$ is peak height of diffraction peak (111) of monoclinic zirconia, $I_M(11\bar{1})$ is peak height of diffraction peak ($11\bar{1}$) of monoclinic zirconia, $I_{T+C}(111)$ is peak height of diffraction peak (111) of tetragonal and cubic zirconia, $I_C(400)$ is peak height of diffraction peak (400) of cubic zirconia, and $I_T(400)$ and $I_T(004)$ are peak heights of diffraction peaks (400) and (004) of tetragonal zirconia, respectively.

Further, in the present invention, "zirconia mainly composed of tetragonal crystal" means that the incorporation of cubic zirconia and monoclinic zirconia is allowed up to 10 vol % and 5 vol %, respectively, in a case where the contents are determined by the above-mentioned X-ray diffraction.

(b) As to that the Zirconia Sintered Body of the Present Invention has a Molar Ratio of $Y_2O_3/ZrO_2$ in the Range of 1.5/98.5 to 4/96

It is necessary to set $Y_2O_3/ZrO_2$ molar ratio in the zirconia sintered body of the present invention in the range of 1.5/98.5 to 4/96, preferably 2/98 to 3.5/96.5.

Generally, the sintered body may contain $HfO_2$ that may be contaminated in $ZrO_2$ as a raw material in a little amount. In this case, the total amount of $ZrO_2$ and $HfO_2$ is regarded as the amount of $ZrO_2$.

If $Y_2O_3/ZrO_2$ molar ratio is less than 1.5/98.5, the content of monoclinic $ZrO_2$ in the zirconia sintered body is increased, and thereby cracks occur in the sintered body, and further the cracks become larger under load for a long time that is a usage condition of mill parts for grinding or dispersing apparatuses or wear resistant machine elements such as bearings to which the sintered bodies is applied, and the sintered body results in fracture or chip. Consequently, the sintered body is not preferable as a lowing in durability is induced. On the other hand., if $Y_2O_3/ZrO_2$ molar ratio is more than 4/96, the content of tetragonal $ZrO_2$ is decreased and the content of cubic $ZrO_2$ is increased. Such a sintered body is not preferable as mechanical properties are lowered.

In the interim, up to 30 mol % of the amount of added $Y_2O_3$ may be replaced with one or more rare earth oxides other than $Y_2O_3$ Such rare earth oxides include $CeO_2$, $Nd_2O_3$, $Yb_2O_3$, $Dy_2O_3$ and the like that are low-cost and preferable.

(c) As to that the Sintered Body has a $SiO_2$ Content of 0.05 to 2.5 wt %

It is necessary for the zirconia sintered body of the present invention to contain $SiO_2$ of 0.05 to 2.5 wt %, preferably 0.05 to 2.0 wt %. $SiO_2$ is segregated near $ZrO_2$ crystal grain boundary and therefore present in $ZrO_2$ crystal grain boundary. The $SiO_2$ has effects that stress corrosion is inhibited and further the bonding of $ZrO_2$ crystal grain boundary is enhanced, and thus $SiO_2$ makes possible to improve durability in case where load is applied. If the content of $SiO_2$ is more than 2.5 wt %, amorphous phase and glassy phase are formed much at $ZrO_2$ crystal grain boundary, the bonding of $ZrO_2$ crystal grain boundary is lowered, stress corrosion occurs easily and the effect of stress-induced phase transformation from tetragonal to monoclinic phase is lowered. Consequently, it is not preferable as a lowering in mechanical properties and durability is led. If $SiO_2$ is less than 0.05 wt %, $SiO_2$ is not partly present in $ZrO_2$ crystal grain boundary, and thereby stress corrosion can not be inhibited and durability is lost, therefore is not preferable.

(d) As to that the Sintered Body has a $Al_2O_3$ Content of 0.05 to 3.0 wt %

It is necessary for the zirconia sintered body of the present invention to contain $Al_2O_3$ of 0.05 to 3.0 wt %, preferably 0.05 to 2.0 wt %. $Al_2O_3$ is not only present at $ZrO_2$ crystal grain boundary as $Al_2O_3$ crystal grain but also segregated at $ZrO_2$ crystal grain boundary and extremely near grain boundary. The addition of $Al_2O_3$ has not only an effect on improvement of sinterability and homogeneity of fine structure but also an effect on inhibition of lowering in properties due to exposure to a dry or a high humidity atmosphere or an aqueous medium at an elevated temperature of about 60 to 150° C. In addition, as $Al_2O_3$ has an effect on strengthening of $ZrO_2$ crystal grain boundary, it confers excellent mechanical properties, such as high-impact strength to the sintered body. If the content of $Al_2O_3$ is less than 0.05 wt %, the effect by the addition of $Al_2O_3$ is not exerted, while if the content of $Al_2O_3$ is more than 3.0 wt %, many $Al_2O_3$ crystal grains are present at $ZrO_2$ crystal grain boundary, thereby durability is lowered and therefore it is not preferable.

(e) As to that the Sintered Body has an Average Crystal Grain Diameter of 0.7 μm or Less It is necessary for the zirconia sintered body of the present invention to have an average crystal grain diameter of 0.7 μm or less, more preferably 0.5 μm or less. Although it is preferable to have smaller crystal grain diameter as mechanical properties, such as wear resistance are improved, the crystal grain diameter of about 0.1 μm is lower limit in the present pulverizing technique.

If the average crystal grain diameter is more than 0.7 μm, not only durability but also mechanical properties, such as wear resistance are lowered, and it is not preferable.

In the interim, the average crystal grain diameter is determined as follows. The surface of a sintered body is polished until it becomes a mirror surface, and then the polished body is exposed to thermal etching or chemical etching, and thereafter observed at ten points thereon with a scanning electron microscope according to the intercept method. The average of the resulting ten values is the average crystal grain diameter and is calculated from the following equation:

$$D=1.5 \times L/n$$

wherein D is an average crystal-grain diameter (μm), n is the number of crystal grains per length L, and L is a measured length (μm).

(f) As to that $SiO_2$ (wt %)×Average Crystal Grain Diameter (μm) Takes a Value Ranging from 0.03 to 0.5

It is necessary for the zirconia sintered body of the present invention to have a value of $SiO_2$ (wt %)×average crystal grain diameter (μm) ranging from 0.03 to 0.5, preferably from 0.03 to 0.3.

$SiO_2$ is segregated near $ZrO_2$ crystal grain boundary, and thus inhibits stress corrosion and improves durability. However, grain boundary surface areas are different each other depending on the crystal particle size. Therefore, it is necessary to control an amount of $SiO_2$ to be added depending on its crystal particle size in order to make $SiO_2$ present homogeneously at crystal grain boundary.

If the value of $SiO_2$ (wt %)×average crystal grain diameter (μm) is more than 0.5, $SiO_2$ present near $ZrO_2$ crystal grain boundary becomes in excess, thereby resulting in amorphous phase and glass phase much at grain boundary, a lowering in the bonding strength of $ZrO_2$ crystal grain boundary, an easy progress of stress corrosion and a lowering of the effect by stress-induced phase transformation from tetragonal phase to monoclinic phase. Therefore, it is not preferable as mechanical properties, wear resistance and durability are lowered. If the value of $SiO_2$ (wt %)×average crystal grain diameter (μm) is less than 0.03, $SiO_2$ is not partly present in $ZrO_2$ crystal grain boundary, and thereby stress corrosion can not be inhibited and durability is lost, therefore it is not preferable.

(g) As to that the Sintered Body Contains at Least One Oxide of $Na_2O$, $K_2O$, CaO and $Fe_2O_3$ as an Impurity and a Weight Ratio of $SiO_2$/(Total Amount of the Impurity) is 5 or More The weight ratio of SiO)(total amount of the impurity) will be expressed also in the weight ratio of $SiO_2$/(total amount of $Na_2O$, $K_2O$, CaO and $Fe_2O_3$), and it is necessary to have 5 or more, preferably 10 or more. If the weight ratio of $SiO_2$/(total amount of $Na_2O$, $K_2O$, CaO and $Fe_2O_3$) is less than 5, glassy phase of $SiO_2$ with $Na_2O$, $K_2O$, CaO and $Fe_2O_3$ is formed much at grain boundary, thereby resulting in corrosion. Consequently, the bonding strength of $ZrO_2$ crystal grain boundary is lowered, stress-induced phase transformation from tetragonal crystal to monoclinic phase is lowered, and thus it leads to a lowering in mechanical properties and durability, and therefore is not preferable.

The impurities, such as $Na_2O$, $K_2O$, CaO and $Fe_2O_3$, etc. are not intentionally mixed, and it is hard to cause glassy phase or amorphous phase and desired as the content becomes low. However, the lowest total amount of the impurity is about 0.008 wt % in the present technique.

(h) As to that the Sintered Body of the Present Invention has a Bulk Density of 5.70 g/cm³ or More It is necessary for the zirconia sintered body of the present invention to have a bulk density of 5.70 g/cm³ or more, preferably 5.80 g/cm³ or more.

If the bulk density is less than 5.70 g/cm³, the sintered body is inferior in resistance against external stress such as friction or impact and at the same time, the sintered body has a lowered resistance against corrosion at a high temperature of about 60 to 150° C. or in an aqueous medium or a high humidity atmosphere at the above-mentioned high temperature, and therefore it is not preferable.

The bulk density is lowered a little as the content of $SiO_2$ becomes high. However, the theoretical density is 6.1 g/cm³ in a range of the composition of the present invention, and therefore the value is essentially the upper limit.

(i) As to that the Zirconia Sintered Body of the Present Invention has a Content of $TiO_2$ of 0.3 wt % or Less The zirconia sintered body of the present invention has a content of $TiO_2$ of 0.3 wt % or less, preferably 0.2 wt %, more preferably 0.1 wt %.

If the content of $TiO_2$ is more than 0.3 wt %, $TiO_2$ is solid-dissolved in $ZrO_2$, the growth of crystal grain diameter is promoted and the crystal grain diameter becomes large, and thus wear resistance and durability are lowered and it is not preferable. $TiO_2$ is impurity and the lower the content thereof is, the more desirable it is. However, the lowest content of $TiO_2$ impurity is about 0.004 wt % in the present technique.

The zirconia based sintered body excellent in durability of the present invention can be produced by several methods. An example among them is explained below, but the present invention is not limited thereto.

The present invention requires a usage of zirconia powders purified by a liquid-phase method. That is, an aqueous solution of a zirconium compound (for example, zirconium oxychloride) is mixed with an aqueous solution of an yttrium compound (for example, yttrium chloride) homogeneously in such a manner that the molar ratio of $ZrO_2$ and $Y_2O_3$ falls in the prescribed one, the mixture is hydrolyzed to give hydrates, the resulting hydrates are dehydrated, dried and calcined at a temperature of 400 to 1250° C. to produce zirconia powders containing a small quantity of impurity other than $Y_2O_3$, $Al_2O_3$ or $SiO_2$.

The components other than $Y_2O_3$ may be added as an aqueous solution of its salt in the prescribed amount into a mixture of an aqueous solution of zirconium compound and an aqueous solution of yttrium compound, or added in a state of hydroxide, carbonate, oxide or the like when calcined powders are ground and dispersed as described below.

Molding powders are produced by grinding and dispersing the resulting calcined powders in wet, optionally adding a known molding auxiliary (e.g., wax emulsion, PVA, an acrylic resin or the like) and drying with a known method, such as spray dry or the like. The resulting molding powders are required to have an average particle size of 0.5 μm or less, more preferably 0.4 μm or less. When the average particle size is more than 0.5 μm, a lowering in sinterability and a lowering in durability and mechanical properties of the sintered body are led, and therefore it is not preferable.

From the resulting molding powders, sintered body in a shape suitable for a desired use can be obtained with a known method, such as press molding, rubber press molding or the like. However, a more preferable method is a method of molding in an organic solvent containing water with a molding auxiliary such as a soluble polymer or water in wet or in a liquid.

Next, the resulting molded products are sintered at a temperature of 1150 to 1550° C., preferably 1150 to 1400° C. to obtain sintered bodies. Further, the sintered bodies are processed in a desired shape to produce parts that require durability and/or wear resistance, for example mill parts for grinding and/or dispersing apparatuses, or bearings. The above-mentioned molded products may be optionally exposed to HIP treatment and improved in resistance against friction, impact, crash and the like, in mechanical properties and further in durability. The HIP treatment is preferably carried out in an inert atmosphere such as Ar, or $N_2$ or $O_2$ atmosphere at a temperature of 1100 to 1400° C.

BEST MODE FOR CARRYING OUT THE INVENTION

Next, the present invention is described on the basis of examples to which the present invention is not limited.

EXAMPLES 1–17 AND COMPARATIVE EXAMPLES 1–20

Zirconium oxychloride of a purity of 99.6% and yttrium nitrate of a purity of 99.9% were mixed to produce an aqueous solution thereof in such a manner that the aqueous solution had a composition shown in Tables 1 and 2. Next, the resulting aqueous solution was heated and hydrolyzed under reflux. Thereby, a precipitate of hydrated zirconium in which $Y_2O_3$ was solid-dissolved was obtained, dehydrated, dried and calcined at 400° C. to 1000° C. for one hour to obtain zirconia powders that thereafter were grained in wet to obtain a slurry. In the interim, components other than $Y_2O_3$ were added in a state of oxides or salts in a prescribed amount on grinding.

Then, the resulting slurry was dried and sized to produce molding powders. The molding powders were molded into a spherical form with a rolling granulation method. The resulting form was sintered at 1000° C. to 1600° C. to obtain spherical sintered bodies having a diameter of 1 mm. The spherical sintered bodies were finished with a barrel wear to produce samples.

Characteristics of these samples are shown in Tables 1 and 2. Examples 1–17 are examples of zirconia based sintered bodies according to the present invention, and comparative examples are examples that do not fulfil at least one requirement of the present invention.

Next, durability was examined under a load at 60° C. for a long time.

1200 cc of the spherical sample having a diameter of 1 mm obtained above was charged in Dyno-Mill (produced by Sinmaru Enterprises Corporation: Type KDL-Pilot) with an internal volume of 1400 cc, and $BaTiO_3$ slurry in a concentration of 20 wt % in which 600 g of $BaTiO_3$ powders (average particle size of 1.5 μm, specific surface area of 1.2 $m^2/g$) produced by KCM Corporation were mixed with 2400 cc of water and which was kept at 60° C. was circulated in the Dyno-Mill at a rate of 300 cc/min while the temperature was controlled between 60° C. and 65° C. The circulation at a disk rotation rate of 8 m/sec for 24 hours was regarded as 1 cycle, 10 cycles were carried out and wear rate in a unit time was measured after each cycle. The wear rate was calculated as rate of change in weight per hour before and after the test. The maximum value of the wear rate of each sample per cycle is indicated in Tables. As to Comparative Examples 15 and 19, wear rate was not measured as the bulk density of the sintered body was not sufficient therefor.

Further, in order to clarify a difference between a durability in a case where a load was applied at an elevated temperature in a high humidity atmosphere and heat deterioration at a temperature of 200 to 300° C., the spherical sample having a diameter of 1 mm described above was charged in an autoclave with an internal volume of 50 cc, 20 cc of pure water was added therein, kept under a condition of 200° C. for 50 hours, cooled and taken out. The sample was confirmed on presence or absence of cracks. As to a sample on which no crack was confirmed, the cross-section of the sample was observed with a microscope, and the depth of deteriorated layer was measured.

EXAMPLES 18–20 AND COMPARATIVE EXAMPLES 21–23

Further, with samples produced in Examples 3, 6 and 13 and Comparative Examples 8, 14 and 16, a durability test in a state where water or steam was not present was carried out by circulating isoparaffin under controlling a temperature between 60° C. and 65° C. The circulation at a disk rotation rate of 8 m/sec for 24 hours was regarded as 1 cycle, 10 cycles were carried out and wear rate in a unit time was measured after each cycle. The wear rate was calculated as rate of change in weight per hour before and after the test. The maximum value of the wear rate of each sample per cycle is indicated in Table 3.

In the interim, Example 18 is a result on the sample produced in Example 3, Example 19 is a result on the sample produced in Example 6, and Example 20 is a result on the sample produced in Example 13. In addition, Comparative Example 21 is a result on the sample produced in Comparative Example 8, Comparative Example 22 is a result on the sample produced in Comparative Example 14, and Comparative Example 23 is a result on the sample produced in Comparative Example 16.

It is clear from the results shown in Tables 1 to 3 that degradation in mechanical properties such as strength or wear resistance in a high humidity atmosphere at an elevated temperature of about 60 to 150° C. is different from thermal degradation at a temperature of 200 to 300° C., and that the zirconia based sintered bodies of the present invention have an excellent durability, regardless of whether they are placed in a high humidity atmosphere at an elevated temperature of about 60 to 150° C. or in a dry state. On the contrary, samples that do not fulfil at least one requirement of the present invention, such as Comparative Examples have little durability.

TABLE 1

| | (a) Crystal Phase (vol %) | | | (b) | (c) | (d) | (e) | Na₂O + K₂O + CaO + Fe₂O₃ Content (wt %) | (g) SiO₂/ (Na₂O + K₂O + CaO + Fe₂O₃) Weight Ratio | (h) Bulk Density (g/cm³) | (f) SiO₂ × Average Crystal Grain Size | TiO₂ (wt %) | 200° C. Autoclave | | Maximum Wear Rate in Grinding at 60° C. (ppm/h) |
|---|---|---|---|---|---|---|---|---|---|---|---|---|---|---|---|
| | Tetragonal Phase | Cubic Phase | Monoclinic Phase | Y₂O₃/ ZrO₂ Molar Ratio | SiO₂ (wt %) | Al₂O₃ (wt %) | Average Crystal Grain Size (μm) | | | | | | Presence or Absence of Cracks | Deteriorated Layer (μm) | |
| Example 1 | 95 | 5 | 0 | 3.7/96.3 | 0.45 | 0.80 | 0.49 | 0.012 | 37.5 | 6.00 | 0.22 | 0.008 | Absence | 10 | 160 |
| Example 2 | 99 | 1 | 0 | 2.9/97.1 | 0.12 | 1.50 | 0.45 | 0.010 | 12.0 | 6.07 | 0.05 | 0.004 | Presence | — | 132 |
| Example 3 | 99 | 0 | 1 | 2.7/97.3 | 0.15 | 0.75 | 0.61 | 0.009 | 16.7 | 6.01 | 0.09 | 0.004 | Presence | — | 175 |
| Example 4 | 100 | 0 | 0 | 2.7/97.3 | 1.10 | 0.38 | 0.25 | 0.025 | 44.0 | 5.95 | 0.28 | 0.007 | Absence | 68 | 130 |
| Example 5 | 100 | 0 | 0 | 3.0/97.0 | 0.30 | 1.00 | 0.32 | 0.028 | 10.7 | 6.05 | 0.10 | 0.004 | Absence | 45 | 135 |
| Example 6 | 100 | 0 | 0 | 2.8/97.2 | 2.30 | 0.40 | 0.21 | 0.044 | 52.3 | 5.80 | 0.48 | 0.012 | Absence | 55 | 153 |
| Example 7 | 100 | 0 | 0 | 2.9/97.1 | 0.50 | 2.50 | 0.38 | 0.016 | 31.3 | 5.98 | 0.19 | 0.010 | Absence | 55 | 166 |
| Example 8 | 96 | 4 | 0 | 3.2/96.8 | 0.35 | 0.26 | 0.33 | 0.055 | 6.4 | 6.03 | 0.12 | 0.034 | Absence | 65 | 166 |
| Example 9 | 95 | 0 | 5 | 1.9/98.1 | 0.45 | 0.60 | 0.21 | 0.013 | 34.6 | 6.01 | 0.09 | 0.005 | Presence | — | 145 |
| Example 10 | 97 | 3 | 0 | 3.1/96.9 | 0.08 | 0.15 | 0.50 | 0.008 | 10.0 | 6.05 | 0.04 | 0.004 | Presence | — | 150 |
| Example 11 | 100 | 0 | 0 | 2.6/97.4 | 1.30 | 0.08 | 0.23 | 0.040 | 32.5 | 5.94 | 0.30 | 0.015 | Absence | 72 | 155 |
| Example 12 | 100 | 0 | 0 | 3.0/97.0 | 1.90 | 0.26 | 0.21 | 0.030 | 63.3 | 5.90 | 0.40 | 0.017 | Absence | 44 | 140 |
| Example 13 | 100 | 0 | 0 | 2.8/97.2 | 0.40 | 0.26 | 0.28 | 0.012 | 33.3 | 6.02 | 0.11 | 0.008 | Absence | 61 | 122 |
| Example 14 | 96 | 4 | 0 | 3.3/96.7 | 0.80 | 1.20 | 0.35 | 0.022 | 36.4 | 5.97 | 0.28 | 0.009 | Absence | 48 | 144 |
| Example 15 | 95 | 5 | 0 | 3.4/96.6 | 0.60 | 1.80 | 0.32 | 0.026 | 23.1 | 6.00 | 0.19 | 0.011 | Absence | 15 | 163 |
| Example 16 | 98 | 0 | 2 | 2.4/97.6 | 1.60 | 0.26 | 0.18 | 0.027 | 59.3 | 5.90 | 0.29 | 0.005 | Absence | 81 | 141 |
| Example 17 | 98 | 2 | 0 | 3.0/97.0 | 0.50 | 0.45 | 0.29 | 0.028 | 17.9 | 6.01 | 0.15 | 0.009 | Absence | 65 | 165 |

TABLE 2

| | (a) Crystal Phase (vol %) | | | (b) | (c) | (d) | (e) | Na₂O + K₂O + CaO + Fe₂O₃ Content (wt %) | (g) SiO₂/ (Na₂O + K₂O + CaO + Fe₂O₃) Weight Ratio | (h) Bulk Density (g/cm³) | (f) SiO₂ × Average Crystal Grain Size | TiO₂ (wt %) | 200° C. Autoclave | | Maximum Wear Rate in Grinding at 60° C. (ppm/h) |
|---|---|---|---|---|---|---|---|---|---|---|---|---|---|---|---|
| | Tetragonal Phase | Cubic Phase | Monoclinic Phase | Y₂O₃/ ZrO₂ Molar Ratio | SiO₂ (wt %) | Al₂O₃ (wt %) | Average Crystal Grain Size (μm) | | | | | | Presence or Absence of Cracks | Deteriorated Layer (μm) | |
| Comparative Example 1 | 85 | 0 | 15 | 1.4/98.6 | 0.40 | 1.20 | 0.25 | 0.020 | 20.0 | 5.80 | 0.10 | 0.004 | Presence | — | 950 |
| Comparative Example 2 | 98 | 2 | 0 | 3.0/97.0 | 0.65 | 0.02 | 0.45 | 0.025 | 26.0 | 6.01 | 0.29 | 0.010 | Presence | — | 470 |
| Comparative Example 3 | 96 | 0 | 4 | 2.6/97.4 | 0.20 | 2.20 | 1.20 | 0.019 | 10.5 | 5.98 | 0.24 | 0.004 | Presence | — | 1200 |
| Comparative Example 4 | 99 | 1 | 0 | 2.9/97.1 | 0.25 | 0.31 | 0.31 | 0.100 | 2.5 | 6.05 | 0.08 | 0.004 | Absence | 25 | 800 |
| Comparative Example 5 | 95 | 5 | 0 | 3.3/96.7 | 2.80 | 0.40 | 0.17 | 0.043 | 65.1 | 5.70 | 0.48 | 0.029 | Absence | 35 | 350 |
| Comparative Example 6 | 95 | 0 | 5 | 2.7/97.3 | 0.04 | 0.50 | 1.25 | 0.008 | 5.0 | 6.01 | 0.05 | 0.004 | Presence | — | 1230 |
| Comparative Example 7 | 99 | 0 | 1 | 2.7/97.3 | 0.05 | 0.85 | 0.42 | 0.015 | 3.3 | 6.05 | 0.02 | 0.020 | Presence | — | 900 |

TABLE 2-continued

| | (a) Crystal Phase (vol %) | | | (b) Y₂O₃/ZrO₂ Molar Ratio | (c) SiO₂ (wt %) | (d) Al₂O₃ (wt %) | (e) Average Crystal Grain Size (μm) | Na₂O + K₂O + CaO + Fe₂O₃ Content (wt %) | (g) SiO₂/(Na₂O + K₂O + CaO + Fe₂O₃) Weight Ratio | (h) Bulk Density (g/cm³) | (f) SiO₂ × Average Crystal Grain Size | TiO₂ (wt %) | 200° C. Autoclave Presence or Absence of Cracks | Deteriorated Layer (μm) | Maximum Wear Rate in Grinding at 60° C. (ppm/h) |
|---|---|---|---|---|---|---|---|---|---|---|---|---|---|---|---|
| | Tetragonal Phase | Cubic Phase | Monoclinic Phase | | | | | | | | | | | | |
| Comparative Example 8 | 95 | 0 | 5 | 2.5/97.5 | 0.10 | 0.15 | 1.10 | 0.065 | 1.5 | 6.03 | 0.11 | 0.004 | Presence | — | 1300 |
| Comparative Example 9 | 97 | 0 | 3 | 2.6/97.4 | 3.50 | 1.60 | 0.35 | 0.065 | 53.8 | 5.75 | 1.23 | 0.020 | Presence | — | 820 |
| Comparative Example 10 | 91 | 9 | 0 | 4.2/95.8 | 0.50 | 2.70 | 0.50 | 0.016 | 31.3 | 6.00 | 0.25 | 0.004 | Absence | 8 | 600 |
| Comparative Example 11 | 94 | 1 | 5 | 2.8/97.2 | 0.04 | 1.80 | 0.70 | 0.008 | 5.0 | 5.95 | 0.03 | 0.010 | Presence | — | 720 |
| Comparative Example 12 | 99 | 0 | 1 | 2.9/97.1 | 1.10 | 1.20 | 0.55 | 0.035 | 31.4 | 5.97 | 0.61 | 0.035 | Presence | — | 920 |
| Comparative Example 13 | 89 | 0 | 11 | 2.1/97.9 | 0.35 | 1.05 | 0.60 | 0.021 | 16.7 | 5.85 | 0.21 | 0.008 | Presence | — | 930 |
| Comparative Example 14 | 100 | 0 | 0 | 2.8/97.2 | 0.10 | 0.45 | 0.22 | 0.010 | 10.0 | 5.95 | 0.02 | 0.004 | Absence | 60 | 780 |
| Comparative Example 15 | 91 | 9 | 0 | 3.5/96.5 | 2.10 | 1.40 | 0.12 | 0.055 | 38.2 | 5.32 | 0.25 | 0.009 | Presence | — | — |
| Comparative Example 16 | 97 | 3 | 0 | 3.1/96.9 | 0.25 | 3.60 | 0.38 | 0.012 | 20.8 | 5.90 | 0.10 | 0.011 | Absence | 40 | 420 |
| Comparative Example 17 | 87 | 13 | 0 | 3.8/96.2 | 0.42 | 0.65 | 0.55 | 0.037 | 11.4 | 5.97 | 0.23 | 0.025 | Absence | 23 | 580 |
| Comparative Example 18 | 97 | 3 | 0 | 3.1/96.9 | 0.006 | 0.30 | 0.32 | 0.011 | 0.5 | 6.06 | 0.002 | 0.004 | Absence | 70 | 980 |
| Comparative Example 19 | 96 | 0 | 4 | 3.0/97.0 | 2.60 | 0.35 | 0.10 | 0.050 | 52.0 | 5.25 | 0.26 | 0.010 | Presence | — | — |
| Comparative Example 20 | 92 | 8 | 0 | 3.0/97.0 | 0.15 | 0.31 | 0.48 | 0.015 | 10.0 | 6.05 | 0.07 | 0.350 | Absence | 30 | 530 |

TABLE 3

| | Maximum Wear Rate in Isopraffin at 60° C. (ppm/h) |
|---|---|
| Example 18 | 0.7 |
| Example 19 | 0.2 |
| Example 20 | 0.3 |
| Comparative Example 21 | 360 |
| Comparative Example 22 | 35 |
| Comparative Example 23 | 154 |

EFFECT OF THE INVENTION

As explained above, the zirconia based sintered body according to the present invention is excellent in durability as it has little corrosion in a case where it is exposed to a dry or a high humidity atmosphere or an aqueous medium at an elevated temperature of about 60 to 150° C., in particular a condition under load for a long time.

Therefore, the zirconia based sintered body according to the present invention can be widely used as parts that the working face part or whole thereof requires high strength and wear resistance, for example mill parts for grinding or dispersing apparatuses, industrial wear resistant structural materials, or wear resistant machine elements, particularly bearings or element parts thereof, and further parts for components of electronic and communication equipments, such as connectors for optical fibers and the like, as well as biomaterials. The parts of the present invention have an excellent durability.

What is claimed is:

1. A zirconia based sintered body excellent in durability, characterized in that in $Y_2O_3$-toughened zirconia based sintered body,
   (a) $ZrO_2$ contained therein is mainly composed of tetragonal $ZrO_2$, and the sintered body contains $Y_2O_3$ as a secondary component and further $SiO_2$ and $Al_2O_3$ as a third component;
   (b) the sintered body has a molar ratio of $Y_2O_3/ZrO_2$ in the range of 1.5/98.5 to 4/96;
   (c) the sintered body has a $SiO_2$ content of 0.05 to 2.5 wt %;
   (d) the sintered body has a $Al_2O_3$ content of 0.05 to 3.0 wt %;
   (e) the sintered body has an average crystal grain diameter of 0.7 $\mu$m or less;
   (f) $SiO_2$ (wt %)×average crystal grain diameter ($\mu$m) takes a value ranging from 0.03 to 0.5;
   (g) the sintered body contains at least one oxide of $Na_2O$, $K_2O$, $CaO$ and $Fe_2O_3$ as an impurity and a weight ratio of $SiO_2$/(total amount of the impurity) is 5 or more; and
   (h) the sintered body has a bulk density of 5.70 g/cm$^3$ or more.

2. The zirconia based sintered body excellent in durability according to claim 1, wherein (b) the sintered body has a molar ratio of $Y_2O_3/ZrO_2$ in the range of 2/98 to 3.5/96.5.

3. The zirconia based sintered body excellent in durability according to claim 1, wherein (c) the sintered body has a $SiO_2$ content of 0.05 to 2.0 wt %.

4. The zirconia based sintered body excellent in durability according to claim 1, wherein (d) the sintered body has a $Al_2O_3$ content of 0.05 to 2.0 wt %.

5. The zirconia based sintered body excellent in durability according to claim 1, wherein (e) the sintered body has an average crystal grain diameter of 0.1 to 0.5 $\mu$m.

6. The zirconia based sintered body excellent in durability according to claim 1, wherein (f) $SiO_2$ (wt %)×average crystal grain diameter ($\mu$m) takes a value ranging from 0.03 to 0.3.

7. The zirconia based sintered body excellent in durability according to claim 1, wherein (g) the weight ratio of $SiO_2$/(total amount of the impurity) is 10 or more.

8. The zirconia based sintered body excellent in durability according to claim 1, wherein (h) the sintered body has a bulk density of 5.80 to 6.1 g/cm$^3$.

9. The zirconia based sintered body excellent in durability according to claim 1, wherein further contains $TiO_2$ as an impurity and the content of $TiO_2$ is 0.3 wt % or less.

10. A part that requires high strength and wear resistance, characterized in that a working face part or whole of the part is made of the zirconia based sintered body according to claim 1.

11. The part according to claim 10, wherein the part is a mill part for a grinding or dispersing apparatus.

12. The part according to claim 10, wherein the part is a bearing or an element part thereof.

13. The zirconia based sintered body excellent in durability according to claim 1, wherein $ZrO_2$ is composed of tetragonal $ZrO_2$ of 95% vol % or more.

* * * * *